United States Patent
Lee et al.

(10) Patent No.: US 10,834,675 B2
(45) Date of Patent: *Nov. 10, 2020

(54) ELECTRONIC DEVICE AND POWER SAVING METHOD THEREOF

(71) Applicant: Samsung Electronics Co., Ltd., Gyeonggi-do (KR)

(72) Inventors: Eun Kyoung Lee, Suwon-si (KR); Kyung Soo Seo, Seoul (KR); Bong Su Chun, Suwon-si (KR); Mi Jin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,960

(22) Filed: Sep. 18, 2017

(65) Prior Publication Data

US 2018/0027496 A1    Jan. 25, 2018

Related U.S. Application Data

(63) Continuation of application No. 14/627,979, filed on Feb. 20, 2015, now Pat. No. 9,769,759.

(30) Foreign Application Priority Data

Feb. 21, 2014   (KR) ........................ 10-2014-0020160

(51) Int. Cl.
*H04W 52/02*   (2009.01)
*H04W 4/80*   (2018.01)
(Continued)

(52) U.S. Cl.
CPC ........ *H04W 52/0261* (2013.01); *G06F 1/163* (2013.01); *H04B 1/385* (2013.01);
(Continued)

(58) Field of Classification Search
CPC ........... H04M 1/7253; H04M 1/72569; H04W 4/008; H04W 52/0261; H04W 68/00; H04W 76/023; H04W 8/005; Y02B 60/50
(Continued)

(56) References Cited

U.S. PATENT DOCUMENTS 9,086,687 B2   7/2015   Park et al.
2006/0126582 A1   6/2006   Saifullah et al.
(Continued)

FOREIGN PATENT DOCUMENTS

KR   10-2009-0101742 A   9/2009
KR   10-2010-0130478 A   12/2010
(Continued)

OTHER PUBLICATIONS

Extended European Search Report, dated Sep. 29, 2017, regarding Application No. 15752624.5, 10 pages.
(Continued)

*Primary Examiner* — Stephen J Clawson

(57) ABSTRACT

An electronic device includes a communication unit and processing circuitry. The communication unit is configured to receive information on whether a user wears other electronic device. The processing circuitry configured to, responsive to a predetermined event occurring, determine whether the other electronic device is worn by the user. The processing circuitry also configured to control the communication unit to transmit a notification message to the other electronic device based on whether the other electronic device is in a worn state or an unworn state.

6 Claims, 10 Drawing Sheets

(51) Int. Cl.
- *H04M 1/725* (2006.01)
- *G06F 1/16* (2006.01)
- *H04B 1/3827* (2015.01)
- *H04W 8/00* (2009.01)
- *H04W 68/00* (2009.01)
- *H04W 76/14* (2018.01)

(52) U.S. Cl.
CPC ..... *H04M 1/7253* (2013.01); *H04M 1/72569* (2013.01); *H04W 4/80* (2018.02); *H04W 8/005* (2013.01); *H04W 68/00* (2013.01); *H04W 76/14* (2018.02); *H04B 2001/3861* (2013.01); *H04M 2250/02* (2013.01); *H04M 2250/12* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/168* (2018.01); *Y02D 70/26* (2018.01); *Y02D 70/40* (2018.01)

(58) Field of Classification Search
USPC ........................................................ 370/311
See application file for complete search history.

(56) References Cited

U.S. PATENT DOCUMENTS

| | | |
|---|---|---|
| 2007/0281762 A1 | 12/2007 | Barros et al. |
| 2007/0288621 A1 | 12/2007 | Gundu et al. |
| 2008/0070612 A1 | 3/2008 | Weinans |
| 2010/0115033 A1 | 5/2010 | Geffner et al. |
| 2011/0014956 A1 | 1/2011 | Lee et al. |
| 2011/0316698 A1 | 12/2011 | Palin et al. |
| 2012/0310391 A1 | 12/2012 | Sanders |
| 2013/0044215 A1 | 2/2013 | Rothkopf et al. |
| 2013/0061289 A1* | 3/2013 | McFarland ......... H04L 63/0428 726/4 |
| 2013/0244633 A1 | 9/2013 | Jacobs et al. |
| 2013/0310088 A1* | 11/2013 | Wong ..................... H04W 4/14 455/466 |
| 2014/0106677 A1 | 4/2014 | Altman |
| 2014/0274033 A1* | 9/2014 | Smart ................ H04W 52/028 455/426.1 |
| 2015/0049657 A1 | 2/2015 | Cheng et al. |
| 2015/0181368 A1 | 6/2015 | Okabayashi |
| 2016/0037346 A1* | 2/2016 | Boettcher ......... H04M 1/72519 455/411 |
| 2016/0174025 A1 | 6/2016 | Chaudhri et al. |

FOREIGN PATENT DOCUMENTS

| | | |
|---|---|---|
| KR | 10-2011-0005541 A | 1/2011 |
| WO | 2012170366 A1 | 12/2012 |
| WO | 2015034163 A1 | 3/2015 |

OTHER PUBLICATIONS

International Search Report, dated Apr. 22, 2015, regarding Application No. PCT/KR2015/001660, 3 pages.

Office Action in connection with European Application No. 15752624.5 dated Dec. 5, 2019, 6 pages.

* cited by examiner

ELECTRONIC DEVICE AND POWER SAVING METHOD THEREOF

CROSS-REFERENCE TO RELATED APPLICATIONS AND CLAIM OF PRIORITY

The present application is a continuation of U.S. patent application Ser. No. 14/627,979 filed on Feb. 20, 2015, which claims priority and is related to Korean patent application No. 10-2014-0020160 filed Feb. 21, 2014, the disclosures of each are hereby incorporated in their entirety by reference.

TECHNICAL FIELD

The present disclosure relates to an electronic device communicable with other electronic device and a power saving method thereof.

BACKGROUND

With the development of electronic technology, various electronic devices have been developed. In recent years, in accordance with the miniaturization of electronic devices, portable electronic devices such as mobile phones and table PCs have been widely used.

Wearable portable electronic devices such as smart watches and smart glasses have been developed in recent years. Such electronic devices may provide various functions as interoperating with other electronic devices such as mobile phones, tablet PCs, and TVs.

The above-mentioned portable electronic devices use batteries as power in general due to their portable property. When a battery is discharged, a portable electronic device becomes unavailable without charging or replacing the battery. Accordingly, a user cannot use an electronic device when it is needed due to battery discharge.

SUMMARY

To address the above-discussed deficiencies, it is a primary object to provide an electronic device used for a longer time with a limited battery capacity by reducing battery consumption and a power saving method thereof.

Various embodiments of the disclosure are directed to providing an electronic device efficiently managing a battery capacity by providing a battery state and a power saving method thereof.

According to an embodiment of the present disclosure, an electronic device includes a communication unit and processing circuitry. The communication unit is configured to receive information on whether a user wears other electronic device. The processing circuitry configured to, responsive to a predetermined event occurring, determine whether the other electronic device is worn by the user. The processing circuitry also configured to control the communication unit to transmit a notification message to the other electronic device based on whether the other electronic device is in a worn state or an unworn state.

According to another embodiment of the present disclosure, an electronic device includes a communication unit and processing circuitry. The communication unit configured to receive a notification message associated with an event occurring with another electronic device. The processing circuitry configured to determine whether a user is wearing the electronic device by sensing a state of the electronic device. The processing circuitry configured to perform a notification of the event occurring from the other electronic device based on whether the electronic device is in a worn state or unworn state.

According to another embodiment of the present disclosure, a power saving method. The method includes determining whether an electronic device is worn by a user. The method also includes determining whether to provide a notification by using the electronic device on the basis of whether the electronic device is worn by the user. The notification is provided based on whether the electronic device is worn by the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
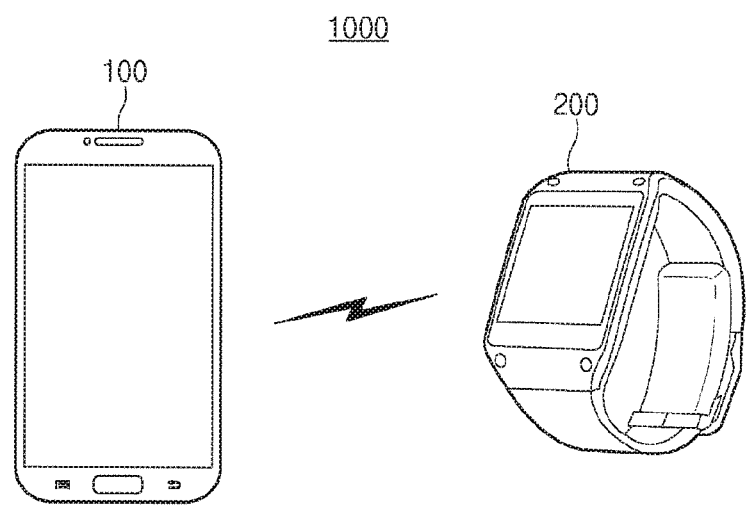
FIG. 1 illustrates a block diagram showing a configuration of a power saving system according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, various embodiments of the present disclosure are disclosed with reference to the accompanying drawings. Various modifications are possible in various embodiments of the present disclosure and specific embodiments are illustrated in drawings and related detailed descriptions are listed. Thus, it is intended that the present disclosure covers the modifications and variations of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. The meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe specific embodiments, and are not intended to limit the scope of the present disclosure. The terms of a singular form may include plural forms unless they have a clearly different meaning in the context.

Unless otherwise defined herein, all the terms used herein, which include technical or scientific terms, may have the same meaning that is generally understood by a person skilled in the art.

It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches).

According to some embodiments, an electronic device may be smart home appliances including a communication function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, and the like), navigation devices, global positioning system (GPS) receivers, event data recorders (EDRs), flight data recorders (FDRs), vehicle infotainment devices, marine electronic equipment (for example, marine navigation systems, gyro compasses, and the like), avionics, security equipment, car head units, industrial or household robots, financial institutions' automatic teller's machines (ATMs), and stores' point of sales (POS).

According to an embodiment of the present disclosure, an electronic device may include at least one of furniture or buildings/structures including a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described in more detail with reference to the accompanying drawings. The term "user" in various embodiments may refer to a person using an electronic device or a device using an electronic device (for example, an artificial intelligent electronic device).

FIG. 1 is a block diagram illustrating a configuration of a power saving system according to an embodiment of the present disclosure.

Referring to FIG. 1, a power saving system 1000 includes a first electronic device 100 and a second electronic device 200. According to an embodiment, the first electronic device 100 may be implemented using a portable electronic device such as a mobile phone or a tablet PC. According to an embodiment, the second electronic device 200 may be implemented using a wearable portable electronic device such as a smart watch or a smart glass.

The first electronic device 100 and the second electronic device 200 may communicate with each other by using short range wireless communication technique such as Bluetooth, Wi-Fi, near field communication (NFC), and ZigBee.

Once a predetermined event occurs, the first electronic device 100 may transmit a notification message to the second electronic device 200. For example, when receiving SMS or voice call, the first electronic device 100 may transmit a notification message notifying that SMS or voice call is received to the second electronic device 200. For another example, when the battery remaining capacity becomes a predetermined capacity (for example, 15% or 10%), the first electronic device 100 may transmit a notification message notifying a battery state to the second electronic device 200. For another example, when receiving a notification message by an event (for example, instant message reception or new information registration in social network service (SNS)) occurring from an installed application, the first electronic device 100 may transmit a notification message for the event occurring in the application to the second electronic device 200.

According to an embodiment, the notification message may include information an event occurring from the first electronic device 100. For example, when receiving SMS message, the first electronic device 100 may include SMS message content in a notification message and may then transmit the notification message.

According to an embodiment, the first electronic device 100 may receive information on whether a user wears the second electronic device 200 from the second electronic device 200. According to whether the user wears the second electronic device 200, the first electronic device 100 may transmit a notification message. For example, when the user wears the second electronic device 200, the first electronic device 100 may transmit a notification message to the second electronic device 200 and when the user does not wear the second electronic device 200, the first electronic device 100 may not transmit a notification message to the second electronic device 200.

According to an embodiment, the first electronic device 100 may receive a notification limiting time from the second electronic device 200. According to an embodiment, the first electronic device 100 may receive a setting for notification limiting time from a user. On the basis of the notification limiting time, the first electronic device 100 may transmit a notification message. For example, the first electronic device 100 may not transmit a notification message to the second electronic device 200 at the notification limiting time and the first electronic device 100 may transmit a notification message to the second electronic device 200 at the time other than the notification limiting time.

According to an embodiment, the first electronic device 100 may transmit a notification message on the basis of whether a user wears the second electronic device 200 and a notification limiting time. When notification message transmission criteria conflicts (for example, when a user wears the second electronic device 200 at a notification limiting time), the first electronic device 100 may determine whether to transmit a notification message according to a priority. According to an embodiment, priorities for a plurality of criteria may be set by a user.

According to an embodiment, when receiving information representing a user's wearing state from the second electronic device 200, the first electronic device 100 may transmit a notification message for an event occurring when the second electronic device 200 is not worn. When there are a plurality of events occurring while the second electronic device 200 is not worn by a user, a notification message for them may be transmitted.

According to an embodiment, the first electronic device 100 may transmit a notification message for an event occurring at the notification limiting time when being out of the notification limiting time. When there are a plurality of events occurring at the notification limiting time, a notification message for them may be transmitted.

The second electronic device 200 may determine whether a user wears it. According to an embodiment, the second electronic device 200 may determine whether a user wears it by using a gyro sensor, an acceleration sensor, a heart rate (HR) sensor, or a touch sensor. For example, the second electronic device 200 determines that it is worn when a heart rate or a touch is sensed from an HR sensor or a touch sensor. For another example, the second electronic device 200 determines that it is not worn when a movement is not detected from a gyro sensor or an acceleration sensor for more than a predetermines time. For another example, even when a movement is detected from a gyro sensor or an acceleration sensor but a heart rate or a touch is not sensed from an HR sensor or a touch sensor, the second electronic device 200 determines that it is not worn.

The second electronic device 200 may transmit information on whether a user wears it to the first electronic device 100. The second electronic device 200 may transmit information on whether a user wears it to the first electronic device 100.

The second electronic device 200 may receive a setting for notification limiting time from a user. When a notification limiting time is set, the second electronic device 200 may transmit the notification limiting time to the first electronic device 100.

When receiving a notification message from the first electronic device 100, the second electronic device 200 may notify an event occurring from the first electronic device to a user by using the received notification message. According to an embodiment, the second electronic device 200 may notify an event occurring from the first electronic device 100 to a user by using at least one of display, vibration, and voice. For example, when the first electronic device 100 receives SMS message, the second electronic device 200 may display the SMS message on a display and may then notify it to a user by the vibration of a vibration module.

According to an embodiment, the second electronic device 200 may notify an event occurring from the first electronic device 100 to a user according to whether the user wears the second electronic device 200. For example, when worn by a user, the second electronic device 200 may notify an event occurring from the first electronic device 100 and while the second electronic device 200 is not worn by a user by a user, may not notify an event occurring from the first electronic device 100.

According to an embodiment, the second electronic device 200 may notify an event occurring from the first electronic device 100 on the basis of a notification limiting time set by a user. For example, the second electronic device 200 may not notify an event occurring from the first electronic device 100 at the notification limiting time and may notify an event occurring from the first electronic device 100 at the time other than the notification limiting time.

According to an embodiment, the second electronic device 200 may notify an event occurring from the first electronic device 100 on the basis of when a user wears the second electronic device 200 and a notification limiting time. When notification message transmission criteria conflicts (for example, when a user wears the second electronic device 200 at a notification limiting time), the second electronic device 200 may determine whether to transmit a notification message according to a priority. According to an embodiment, priorities for a plurality of criteria may be set by a user.

According to an embodiment, when an unworn state changes into a worn state, the second electronic device 200 may notify that an event corresponding to a notification message received in an unworn state occurs. When a notification message received in an unworn state is in plurality, a plurality of events may be notified.

According to an embodiment, the second electronic device 200 may notify an event corresponding to a notification message received at a notification limiting time when being out of the notification limiting time. When a notification message received in an unworn state is in plurality, a plurality of events may be notified.

According to an embodiment, the second electronic device 200 may not notify an event occurring from the first electronic device 100 in an unworn state. Accordingly, the second electronic device 200 may reduce battery consumption due to an unnecessary notification operation.

According to an embodiment, when the battery remaining capacity becomes a predetermined capacity (for example, 5%, 15%, or 100%), the second electronic device 200 may transmit a notification message to the first electronic device 100. According to an embodiment, when the battery remaining capacity becomes a predetermined capacity in an unworn state, the second electronic device 200 may transmit a notification message to the first electronic device 100. According to an embodiment, the notification message may include information representing the battery remaining capacity of the second electronic device 200.

When receiving a notification message from the second electronic device 200, the first electronic device 100 may notify the battery remaining capacity of the second electronic device 200 to a user. A user may input a power saving mode enter command to reduce the battery consumption of the second electronic device 200. Once the power saving mode enter command is inputted from a user, the first electronic device 100 may transmit a power saving mode enter signal to the second electronic device 200.

According to the power saving mode enter signal received from the first electronic device 100, the second electronic device 200 may enter a power saving mode.

Accordingly, even when not wearing the second electronic device 200, a user may obtain a battery state of the second electronic device 200 through the first electronic device 100.

According to an embodiment, when the battery remaining capacity becomes a predetermined capacity (for example, 5%, 10%, or 100%), the first electronic device 100 may transmit a notification message to the second electronic device 200.

According to an embodiment, if the battery remaining capacity becomes a predetermined capacity (for example, 5%, 10%, or 100%) while a user wears the second electronic device 200, the first electronic device 100 may transmit a notification message to the second electronic device 200.

When receiving the notification message, the second electronic device 200 may notify the battery remaining capacity of the first electronic device 100 to a user. A user may input a power saving mode enter command to reduce the battery consumption of the first electronic device 100. Once the power saving mode enter command is inputted from a user, the second electronic device 200 may transmit a power saving mode enter signal to the first electronic device 100.

According to the power saving mode enter signal received from the second electronic device 200, the first electronic device 100 may enter a power saving mode.

Accordingly, a user may check a battery state of the first electronic device 100 through the second electronic device 200 and may allow the first electronic device 100 to enter a power saving mode conveniently by using the second electronic device 200.

According to an embodiment, the first electronic device 100 and the second electronic device 200 may communicate with each other through a first communication method (for example, Bluetooth low energy (BLE)). According to an embodiment, as receiving a voice or video call while a user wears the second electronic device 200, the first electronic device 100 may transmit a notification message including voice or video call reception information.

Once the notification message is received, the second electronic device 200 may notify that the voice or video call is received. A user may input a voice or video call acceptance command. Once the voice or video call acceptance command is inputted from a user, the second electronic device 200 may transmit a call acceptance signal to the first electronic device 100.

Once the call acceptance signal is received, the first electronic device 100 may connect to the second electronic device 200 through a second communication method (for example, Bluetooth classic). According to an embodiment, the first communication method may be a less power consumption method than the second communication method. According to an embodiment, the first electronic device 100 may release the connection of the first communication method before connecting to the second electronic device 200 through the second communication method. The first electronic device 100 may transmit/receive voice data to/from the second electronic device 200 through the second communication method.

The first electronic device 100 may release the connection of the second communication method with the second electronic device 200 once a voice or video call is terminated. According to an embodiment, when the connection of the first communication method is released according to the connection of the second communication method, as the connection of the second communication method is released, the first electronic device 100 may connect to the second electronic device 200 again through the first communication method.

The first electronic device 100 and the second electronic device 200 may reduce battery consumption by using the first communication method, except for voice data transmission.

Figure 2:
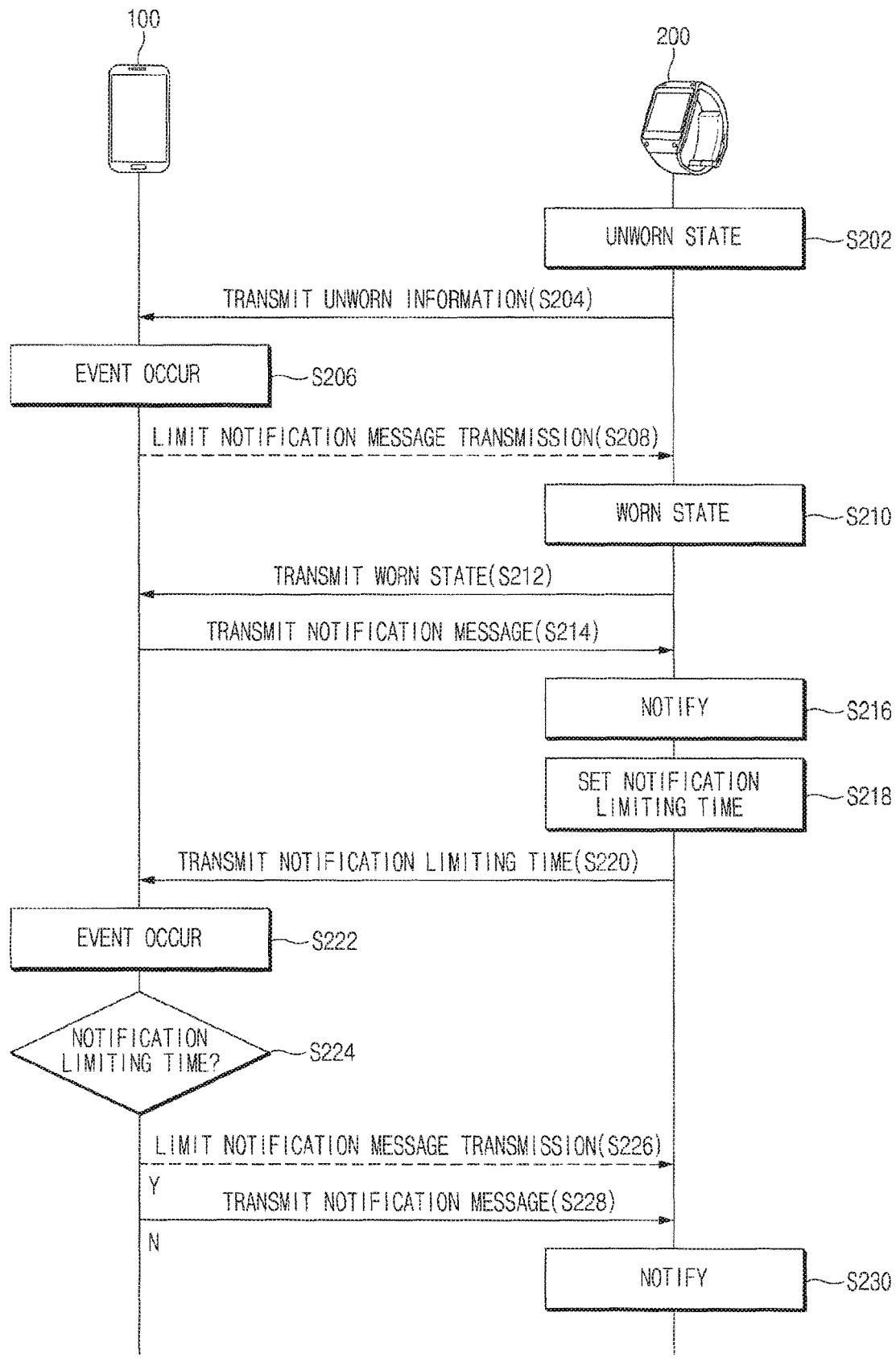
FIG. 2 illustrates a process of a power saving method of a power saving system according to an embodiment of the present disclosure.

FIG. 2 is a flowchart illustrating a power saving method of a power saving system according to an embodiment of the present disclosure.

The flowchart shown in FIG. 2 may be configured with time-series processes in the power saving system shown in FIG. 1. Accordingly, even contents omitted below, which are described above for the power saving system shown in FIG. 1, may be applied to the flowchart of FIG. 2.

Referring to FIG. 2, the second electronic device 200 determines whether a user wears it to decide an unworn state in operation S202. The second electronic device 200 may transmit information representing an unworn state to the first electronic device 100 in operation S204. According to an embodiment, the second electronic device 200 may determine whether a user wears it by using a gyro sensor, an acceleration sensor, a heart rate (HR) sensor, or a touch sensor.

Once a predetermined event occurs when a user does not wear the second electronic device 200 in operation S206, the first electronic device 100 may not transmit a notification message to the second electronic device 200 in operation S208.

When in a worn state in operation S210, the second electronic device 200 may transmit information on the worn state to the first electronic device 100 in operation S212. According to an embodiment, each time a user's wearing state changes, the second electronic device 200 may transmit information representing the user's wearing state to the first electronic device 100.

When receiving information representing a user's wearing state from the second electronic device 200, the first electronic device 100 may transmit a notification message for an event occurring when the second electronic device 200 is not worn in operation S214.

Once the notification message is received, the second electronic device 200 may notify an event occurring in an unworn state in operation S216. According to an embodiment, the second electronic device 200 may notify an event corresponding to the received notification message to a user by using at least one of display, vibration, and voice.

The second electronic device 200 may receive a setting for notification limiting time in operation S218. When a notification limiting time is set, the second electronic device 200 may transmit the notification limiting time to the first electronic device 100 in operation S220. According to an embodiment, the first electronic device 100 may receive a setting for notification limiting time from a user.

Once a predetermined event occurs in operation S222, the first electronic device 100 may determine whether the event occurs at a notification limiting time in operation S224. When the event occurs at the notification limiting time in operation S224-Y, the first electronic device 100 may not transmit a notification message to the second electronic device 200 in operation S226. When the event does not occur at the notification limiting time in operation S224-N, the first electronic device 100 may transmit a notification message to the second electronic device 200 in operation S228.

When receiving the notification message from the first electronic device 100, the second electronic device 200 may notify an event corresponding to the received notification message in operation S230.

According to the embodiment described with reference to FIG. 2, the second electronic device 200 may reduce battery consumption due to an unnecessary notification operation in a situation that a user cannot recognize.

Figure 3:
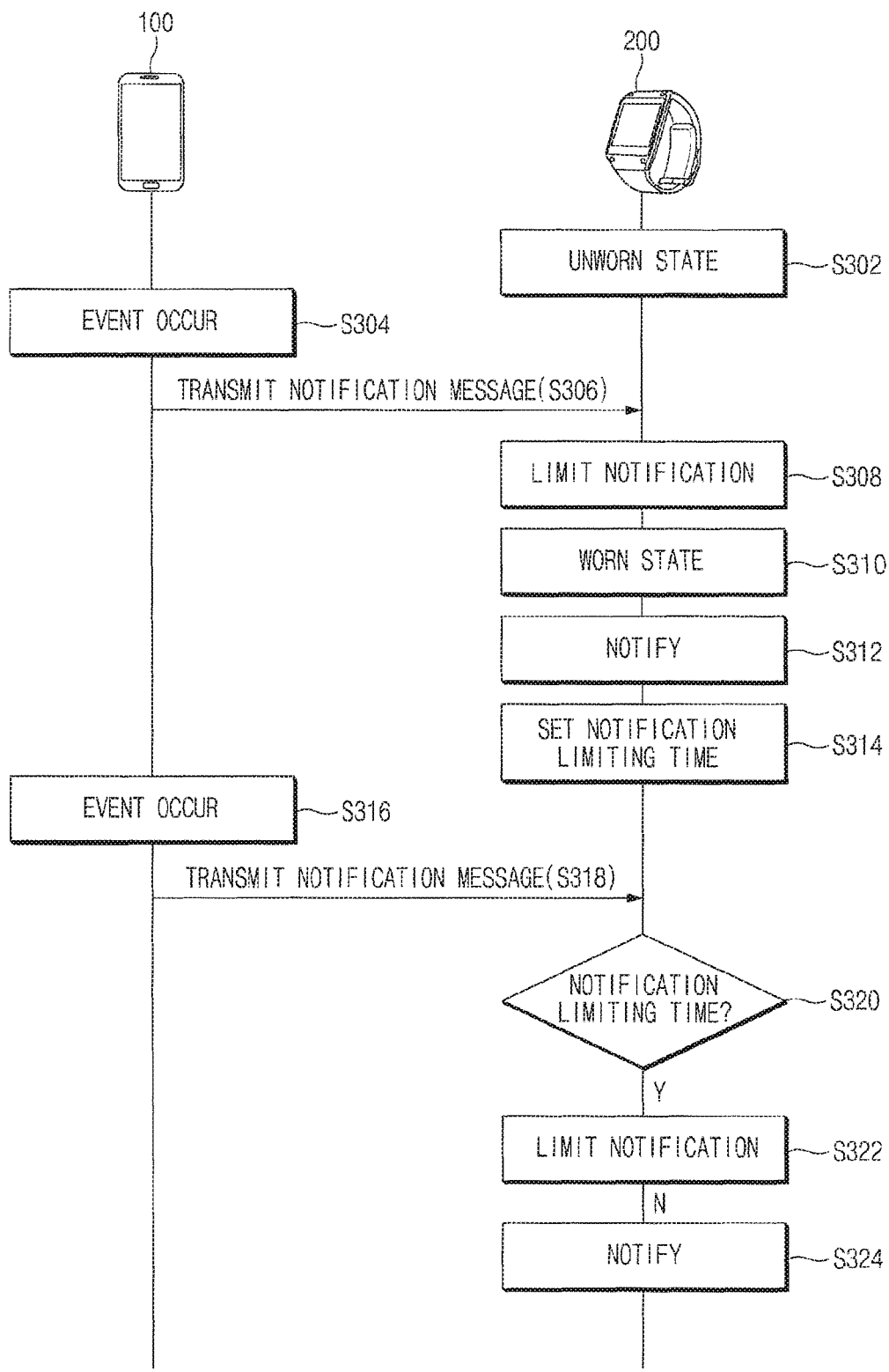
FIG. 3 illustrates a process of a power saving method of a power saving system according to an embodiment of the present disclosure.

FIG. 3 is a flowchart illustrating a power saving method of a power saving system according to an embodiment of the present disclosure.

Referring to FIG. 3, the second electronic device 200 determines whether a user wears to decide an unworn state in operation S302. According to an embodiment, the second electronic device 200 may determine whether a user wears it by using a gyro sensor, an acceleration sensor, a heart rate (HR) sensor, or a touch sensor. Once a predetermined event occurs in the first electronic device 100 in operation S304, the first electronic device 100 may transmit a notification message to the second electronic device 200 in operation S306.

Once the notification message is received in an unworn state, the second electronic device 200 may not notify an event corresponding to the received notification message in operation S308. According to an embodiment, the second electronic device 200 may notify an event occurring from the first electronic device 100 to a user according to whether the user wears the second electronic device 200. For example, when worn by a user, the second electronic device 200 may notify an event occurring from the first electronic device 100 and while the second electronic device 200 is not worn by a user by a user, may not notify an event occurring from the first electronic device 100.

When the second electronic device 200 becomes in a worn state in operation S310, the second electronic device 200 may notify an event corresponding to the notification message received in an unworn state in operation S312. According to an embodiment, the second electronic device 200 may notify an event corresponding to the received notification message to a user by using at least one of display, vibration, and voice.

The second electronic device 200 may receive a setting for notification limiting time in operation S314. Once a predetermined event occurs from the first electronic device 100 after the notification limiting time setting in operation S316, the first electronic device 100 may transmit a notification message to the second electronic device 200 in operation S318. According to an embodiment, the first electronic device 100 may receive a setting for notification limiting time from a user. The first electronic device 100 may transmit the notification limiting time set by a user to the second electronic device 200.

Once the notification message is received, the second electronic device 200 may determine whether the event occurs at the notification limiting time in operation S320. When the event occurs at the notification limiting time in operation S320-Y, the second electronic device 100 may not notify an event corresponding to the received notification message in operation S322. When the event does not occur at the notification limiting time in operation S330-N, the second electronic device 200 may not notify an event corresponding to the received notification message in operation S324.

According to the embodiment described with reference to FIG. 3, the second electronic device 200 may reduce battery consumption due to an unnecessary notification operation in a situation that a user cannot recognize.

Figure 4:
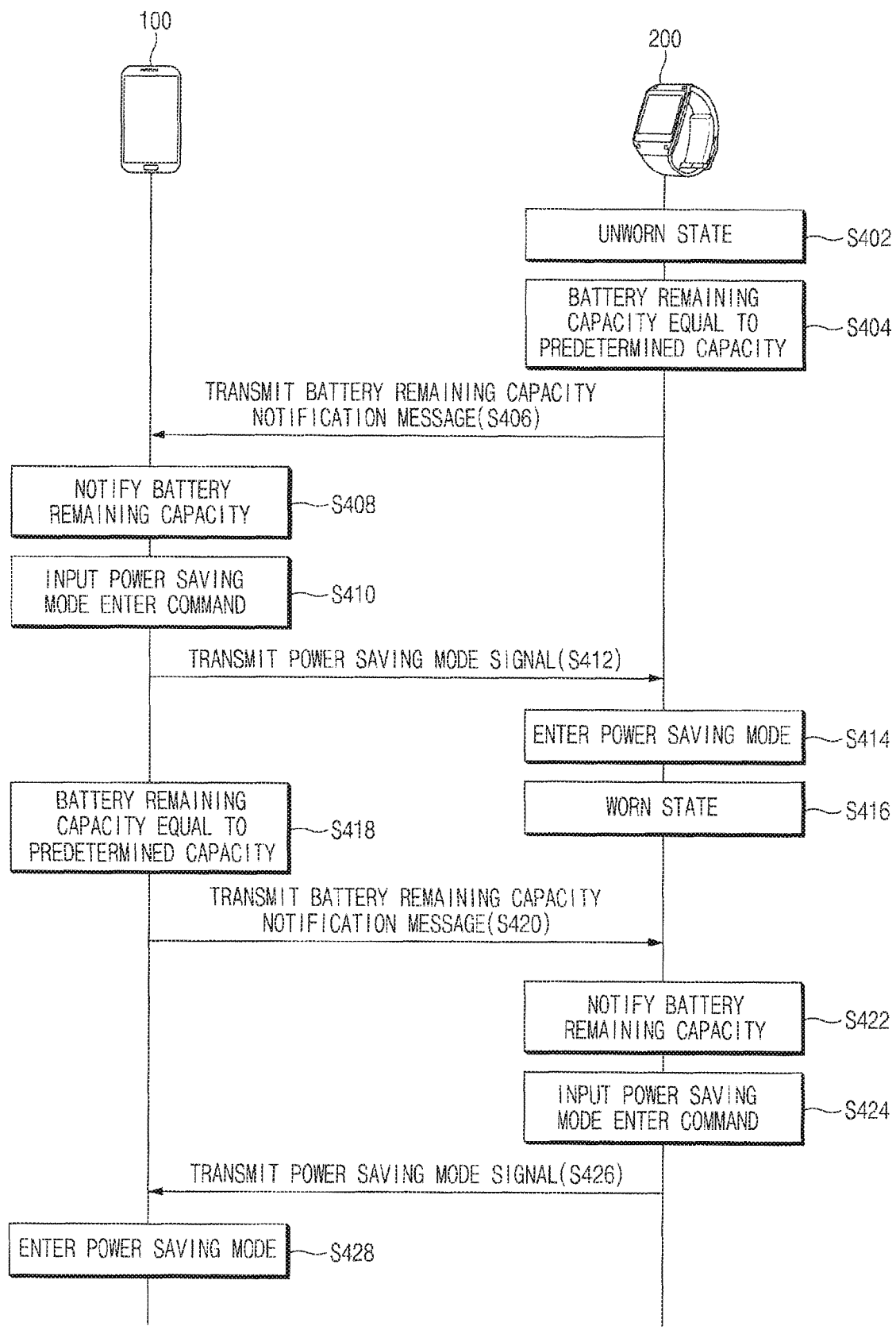
FIG. 4 illustrates a process of a power saving method of a power saving system according to an embodiment of the present disclosure.

FIG. 4 is a flowchart illustrating a power saving method of a power saving system according to an embodiment of the present disclosure.

Referring to FIG. 4, the second electronic device 200 determines whether a user wears it to decide an unworn state in operation S402. According to an embodiment, the second electronic device 200 may determine whether a user wears it by using a gyro sensor, an acceleration sensor, a heart rate (HR) sensor, or a touch sensor.

The second electronic device 200 checks the battery remaining capacity of the second electronic device 200 to determine whether it is a predetermined capacity. When the battery remaining capacity of the second electronic device 200 is the predetermined capacity in operation S404, the second electronic device 200 may transmit a notification message to the first electronic device 100 in operation S406. According to an embodiment, when the battery remaining capacity of the second electronic device 200 becomes the predetermined capacity in an unworn state, the second electronic device 200 may transmit a notification message to the first electronic device 100. According to an embodiment, the notification message may include information on the battery remaining capacity of the second electronic device 200.

When receiving the notification message, the first electronic device 100 may notify that the battery remaining capacity of the second electronic device 200 is the predetermined capacity in operation S408. According to an embodiment, the first electronic device 100 may notify that the battery remaining capacity of the second electronic device 200 is the predetermined capacity by using at least one of display, vibration, and voice.

The first electronic device 100 may receive a power saving mode enter command from a user in operation S410. Once the power saving mode enter command is inputted from a user, the first electronic device 100 may transmit a power saving mode enter signal to the second electronic device 200 in operation S412.

According to the power saving mode enter signal received from the first electronic device 100, the second electronic device 100 may enter a power saving mode.

Accordingly, even when not wearing the second electronic device 200, a user may obtain a battery state of the second electronic device 200 through the first electronic device 100 and also may expect a usage available time of the second electronic device 200. Additionally, the second electronic device 200 may enter a power saving mode conveniently by using the first electronic device 100.

The second electronic device 200 may determine whether a user wears it to decide a worn state in operation S416. According to an embodiment, the second electronic device 200 may transmit information representing a worn state to the first electronic device 100.

The first electronic device 100 checks its battery remaining capacity to determine whether the batter remaining capacity is a predetermined capacity. When the battery remaining capacity of the first electronic device 100 is the predetermined capacity in operation S418, the first electronic device 100 may transmit a notification message to the second electronic device 200 in operation S420. According to an embodiment, when the second electronic device 200 is in a worn state, the first electronic device 100 may transmit a notification message to the second electronic device 200.

When receiving the notification message, the second electronic device 200 may notify that the battery remaining capacity of the first electronic device 100 is the predetermined capacity in operation S422. According to an embodiment, when in a user's wearing state, the second electronic device 200 may notify that the battery remaining capacity of the first electronic device 100 is the predetermined capacity.

The second electronic device 200 may receive a power saving mode enter command from a user in operation S424. Once the power saving mode enter command is inputted from a user, the second electronic device 200 may transmit a power saving mode enter signal to the first electronic device 100 in operation S426.

According to the power saving mode enter signal received from the second electronic device 200, the first electronic device 100 may enter a power saving mode in operation S428.

Accordingly, a user may check a battery state of the first electronic device 100 through the second electronic device 200 and also may expect a usage available time of the first electronic device 100. Additionally, the first electronic device 100 may enter a power saving mode conveniently by using the second electronic device 200.

Figure 5:
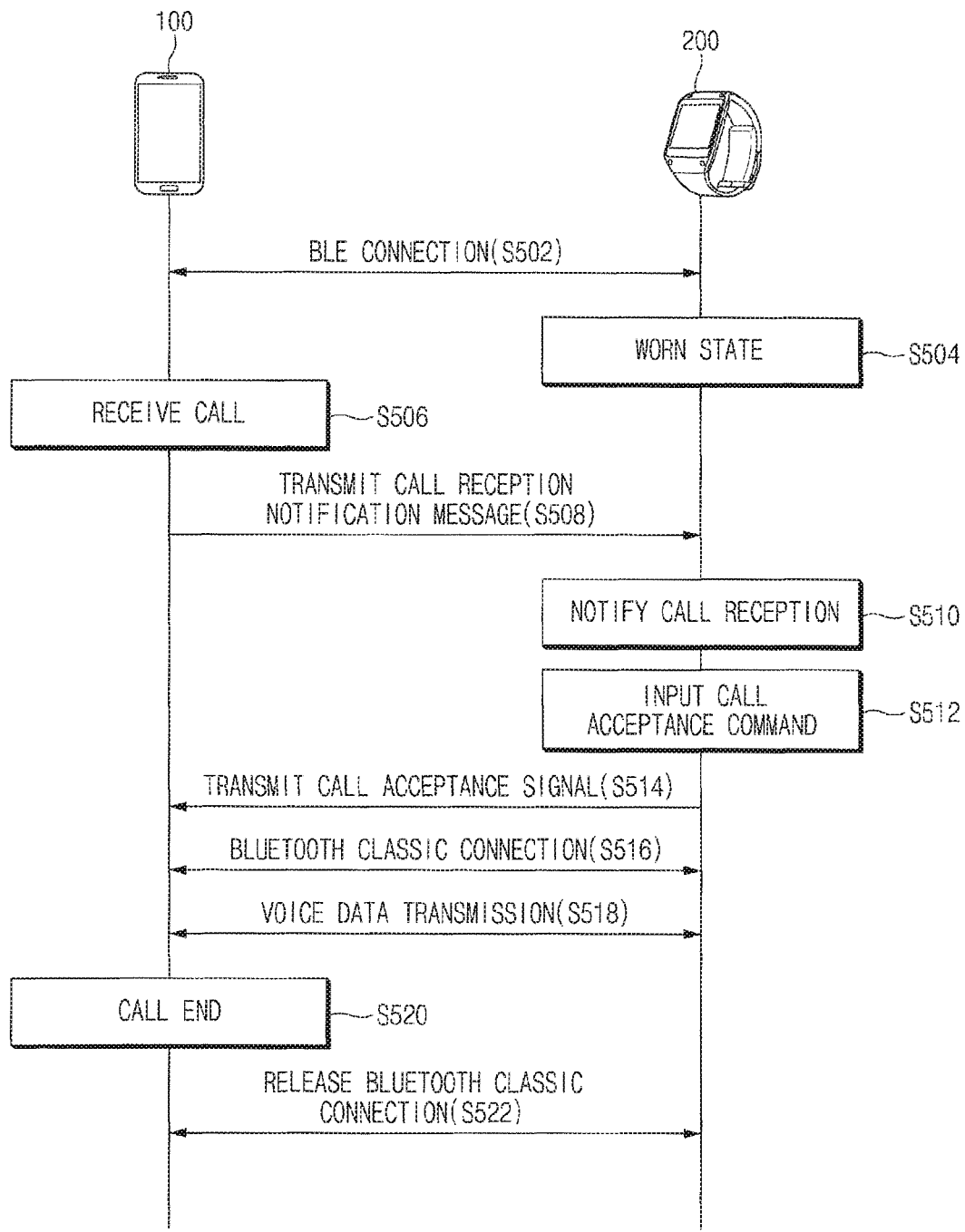
FIG. 5 illustrates a process of a power saving method of a power saving system according to an embodiment of the present disclosure.

FIG. 5 is a flowchart illustrating a power saving method of a power saving system according to an embodiment of the present disclosure.

Referring to FIG. 5, the first electronic device 100 and the second electronic device 200 may connect to each other through a first communication method (for example, Bluetooth low energy (BLE)). The second electronic device 200 may determine whether a user wears it to decide a worn state in operation S504. According to an embodiment, the second electronic device 200 may determine whether a user wears it by using a gyro sensor, an acceleration sensor, a heart rate (HR) sensor, or a touch sensor. According to an embodiment, the second electronic device 200 may transmit information representing a worn state to the first electronic device 100.

The first electronic device 100 may receive a voice or video call in operation S506. As receiving a voice or video call, the first electronic device 100 may transmit a notification message including voice or video call reception information to the second electronic device 200 in operation S508. According to an embodiment, when the second electronic device 100 is in a worn state, the first electronic device 100 may transmit a notification message including voice or video call reception information to the second electronic device 200.

Once the notification message is received, the second electronic device 200 may notify that the voice or video call is received in operation S510. According to an embodiment, once the notification message is received while the second electronic device in a user's wearing state, the second electronic device 200 may notify that the voice or video call is received.

The second electronic device 200 may receive a voice or video call acceptance command from a user in operation S512. Once the voice or video call acceptance command is inputted from a user, the second electronic device 200 may transmit a call acceptance signal to the first electronic device 100 in operation S514.

Once the call acceptance signal is received, the first electronic device 100 may connect to the second electronic device 200 through a second communication method (for example, Bluetooth classic) in operation S516. According to an embodiment, the first communication method may be a less power consumption method than the second communication method. According to an embodiment, the first electronic device 100 may release the connection of the first communication method before connecting to the second electronic device 200 through the second communication method. The first electronic device 100 may transmit/receive voice data to/from the second electronic device 200 through the second communication method in operation S518.

Once the voice or video call is terminated in operation S520, the first electronic device 100 may release the second communication method with the second electronic device 200 in operation S512. According to an embodiment, when the connection of the first communication method is released according to the connection of the second communication method, as the connection of the second communication method is released, the first electronic device 100 may connect to the second electronic device 200 again through the first communication method.

Accordingly, the first electronic device 100 and the second electronic device 200 may reduce battery consumption by using the first communication method, except for voice data transmission.

A method according to an embodiment of the present disclosure may include checking whether a user wears the second electronic device 200 and determining whether to provide a notification through the second electronic device 200 on the basis of whether the user wears the second electronic device 200. The determining of whether to provide the notification includes providing a notification when the user wears the second electronic device and not providing a notification when the user does not wear the second electronic device.

Figure 6:
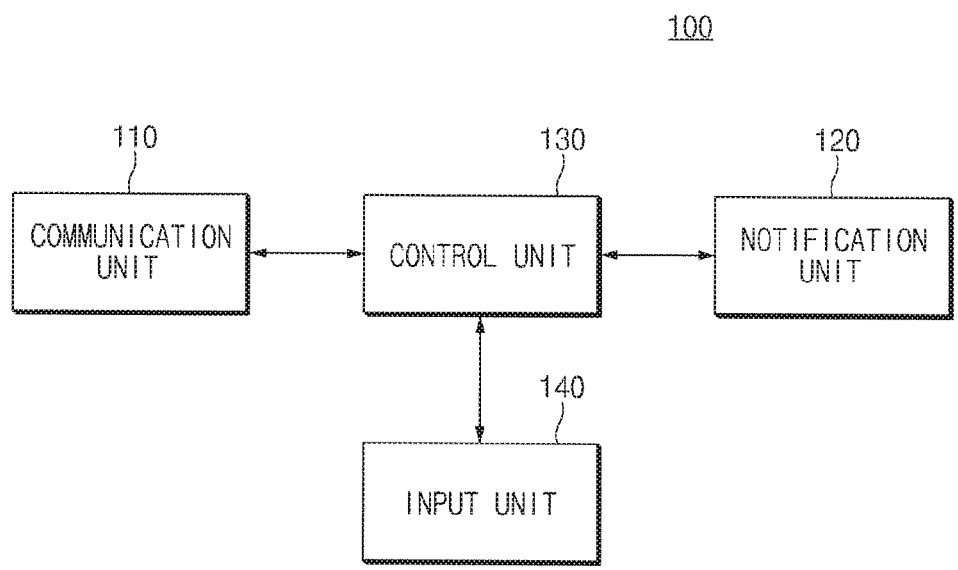
FIG. 6 illustrates a block diagram showing a configuration of a first electronic device according to an embodiment of the present disclosure.

FIG. 6 is a block diagram illustrating a configuration of a first electronic device according to an embodiment of the present disclosure.

Referring to FIG. 6, a first electronic device 100 may include a communication unit 110, a notification unit 120, and a control unit 130.

The communication unit 110 may be connected to communicate with the second electronic device 200. According to an embodiment, the communication unit 110 may receive information on whether a user wears the second electronic device 200 from the second electronic device 200.

Once a predetermined event occurs, the communication unit 110 may transmit a notification message for the event to the second electronic device 200. According to an embodiment, the communication unit 110 may transmit a notification message for the event to the second electronic device 200 on the basis of whether a user wears the second electronic device 200. For example, when the user wears the second electronic device 200, the communication unit 110 may transmit a notification message to the second electronic device 200 and when the user does not wear the second electronic device 200, the communication unit 110 may not transmit a notification message to the second electronic device 200.

According to an embodiment, the notification message may include information an event occurring from the first electronic device 100. For example, when receiving SMS message, the first electronic device 100 may include SMS message content in a notification message and may then transmit the notification message.

According to an embodiment, the communication unit 110 may receive a notification limiting time from the second electronic device 200. On the basis of the notification limiting time, the communication unit 110 may transmit a notification message. For example, the communication unit 110 may not transmit a notification message to the second electronic device 200 at the notification limiting time and the communication unit 110 may transmit a notification message to the second electronic device 200 at the time other than the notification limiting time.

According to an embodiment, the communication unit 110 may transmit a notification message on the basis of whether a user wears the second electronic device 200 and a notification limiting time. When notification message transmission criteria conflicts (for example, when a user wears the second electronic device 200 at a notification limiting time), the communication unit 110 may determine whether to transmit a notification message according to a priority. According to an embodiment, priorities for a plurality of criteria may be set by a user.

According to an embodiment, when receiving information representing a user's wearing state from the second electronic device 200, the communication unit 110 may transmit a notification message for an event occurring when the second electronic device 200 is not worn. When there are a plurality of events occurring while the second electronic device 200 is not worn by a user, a notification message for them may be transmitted.

According to an embodiment, the communication unit 110 may transmit a notification message for an event occurring at the notification limiting time when being out of the notification limiting time. When there are a plurality of events occurring at the notification limiting time, a notification message for them may be transmitted.

According to an embodiment, the communication unit 110 may transmit a notification limiting time inputted to the input unit 140 to the second electronic device 200.

According to an embodiment, as the battery remaining capacity is lower than a predetermined capacity while the second electronic device 200 is in a worn state, the communication unit 110 may transmit a notification message to the second electronic device 200. According to an embodiment, the communication unit 110 may receive a power saving mode enter signal from second electronic device 200.

According to an embodiment, the communication unit 110 may receive a notification message representing a battery state of the second electronic device 200 from the second electronic device 200. The notification message may include information representing the battery remaining capacity of the second electronic device 200.

According to an embodiment, once a power saving mode enter command is inputted to the input unit 140, the communication unit 110 may transmit a power saving mode enter signal to the second electronic device 200. According to an embodiment, the communication unit 110 may communicate with the second electronic device 200 through a first communication method (for example, Bluetooth low energy (BLE)). According to an embodiment, as receiving a voice or video call while a user wears the second electronic device 200, the communication unit 110 may transmit a notification message including voice or video call reception information.

Once the call acceptance signal is received from the second electronic device 200, the communication unit 110 may connect to the second electronic device 200 through a second communication method (for example, Bluetooth classic). According to an embodiment, the communication unit 110 may release the connection of the first communication method before connecting to the second electronic device 200 through Bluetooth classic. The first electronic device 100 may transmit/receive voice data to/from the second electronic device 200 through the second communication method.

Once a predetermined event occurs from the first electronic device 100, the notification unit 120 may notify the occurring event to a user. According to an embodiment, the notification unit 120 may include at least one of a display, a vibration module, or an audio module. The notification unit 120 may notify an event to a user by using at least one of display, vibration, or voice. For example, on the receipt of SMS message, the notification unit 120 may display the content of the SMS message on a display and may then notify it to a user by the vibration of a vibration module.

According to an embodiment, on the receipt of a notification message representing a battery state of the second electronic device 200, the notification unit 120 may notify the battery state of the second electronic device 200.

The control unit 130 may control overall operations of the first electronic device 100. According to an embodiment, the control unit 130 may perform a control to transmit a notification message on the basis of whether a user wears the second electronic device 200.

According to an embodiment, the control unit 130 may perform a control to transmit a notification message on the basis of a notification limiting time. According to an embodiment, on the receipt of a power saving mode enter signal from the second electronic device 200, the control unit 130 may perform a control to enter a power saving mode.

The input unit 140 may receive a user command. According to an embodiment, the input unit 140 may receive a notification limiting time from a user. According to an embodiment, the input unit 140 may receive a power saving mode enter command from a user.

According to an embodiment, the input unit 140 may be implemented using a touch screen or a touch pad, each operating by a user's touch input.

According to various embodiments of the present disclosure, a first electronic device includes a communication unit receiving information on whether a user wears a second electronic device from the second electronic device and a control unit performing a control to transmit a notification message for an event to the second electronic device on the basis of whether the user wears the second electronic device once a predetermined event occurs. The control unit transmits a notification message to the second electronic device when the user wears the second electronic device and does not transmit a notification message to the second electronic device when the user does not wear the second electronic device.

Figure 7:
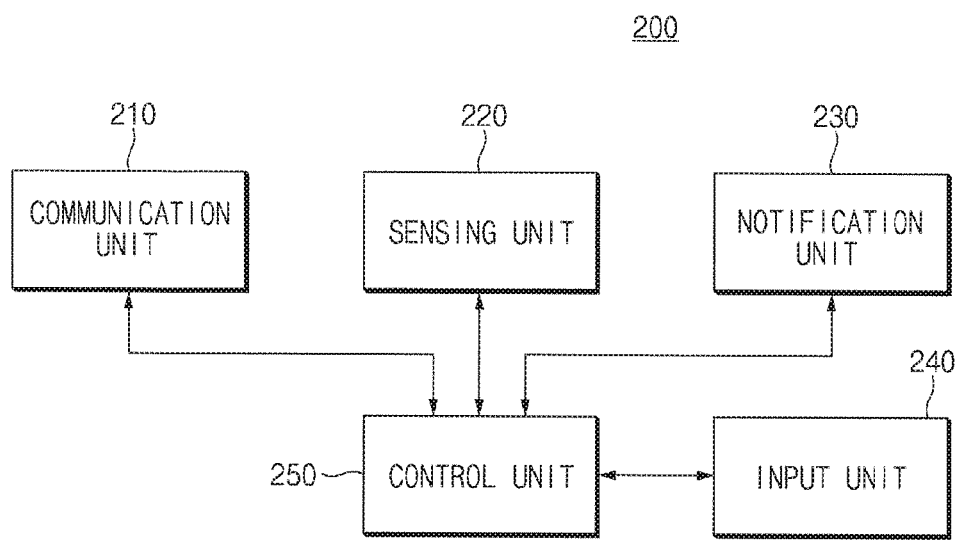
FIG. 7 illustrates a block diagram showing a configuration of a second electronic device according to an embodiment of the present disclosure.

FIG. 7 is a block diagram illustrating a configuration of a second electronic device according to an embodiment of the present disclosure.

Referring to FIG. 7, a second electronic device 200 may include a communication unit 210, a sensing unit 220, a notification unit 230, an input unit 240, and a control unit 250.

The communication unit 210 may be connected to communicate with the first electronic device 100. According to an embodiment, the communication unit 210 may transmit information on whether a user wears the second electronic device 200 determined by the sensing unit 220 to the first electronic device 100. According to an embodiment, the communication unit 210 may transmit information on whether a user wears the second electronic device 200 to the first electronic device 100 each time a user's wearing state changes.

The communication unit 210 may receive a notification message from the first electronic device 100.

When the battery remaining capacity becomes a predetermined capacity (for example, 5%, 15%, or 100%) in an unworn state, the communication unit 210 may transmit a notification message to the first electronic device 100. According to an embodiment, the notification message may include information representing the battery remaining capacity of the second electronic device 200.

Once a power saving mode enter command is inputted to the input unit 240, the communication unit 210 may transmit a power saving mode enter signal to the first electronic device 100.

According to an embodiment, the communication unit 210 may communicate with the first electronic device 100 through BLE. According to an embodiment, as the first electronic device 100 receives a voice or video call, the communication unit 210 may communicate with the first electronic device 100 through Bluetooth classic. The communication unit 210 may transmit/receive voice data to/from the first electronic device 100 through Bluetooth classic.

The sensing unit 220 may determine whether a user wears the second electronic device 200. According to an embodiment, the sensing unit 220 may include a gyro sensor, an acceleration sensor, a heart rate (HR) sensor, or a touch sensor. The sensing unit 220 determines whether a user wears the second electronic device 200 by using a sensing value inputted from a gyro sensor, an acceleration sensor, a heart rate (HR) sensor, or a touch sensor. For example, the second electronic device 200 determines that it is worn when a heart rate or a touch is sensed from an HR sensor or a touch sensor. For another example, the second electronic device 200 determines that it is not worn when a movement is not detected from a gyro sensor or an acceleration sensor for more than a predetermines time. For another example, even when a movement is detected from a gyro sensor or an acceleration sensor but a heart rate or a touch is not sensed from an HR sensor or a touch sensor, the second electronic device 200 determines that it is not worn.

When receiving a notification message from the first electronic device 100, the notification unit 230 may notify an event occurring from the first electronic device to a user by using the received notification message. According to an embodiment, the notification unit 230 may include at least one of a display, a vibration module, or an audio module. The notification unit 230 may notify an event to a user by using at least one of display, vibration, or voice.

According to an embodiment, the notification unit 230 may notify an event occurring from the first electronic device 100 to a user according to whether the user wears the second electronic device 200. For example, when the second electronic device 200 is worn by a user, the notification unit 230 may notify an event occurring from the first electronic device 100 and when the second electronic device 200 is not worn by a user, may not notify an event occurring from the first electronic device 100.

According to an embodiment, the notification unit 230 may notify an event occurring from the first electronic device 100 on the basis of a notification limiting time inputted by a user. For example, the first electronic device 100 may not notify an event occurring from the first electronic device 100 at the notification limiting time and may notify an event occurring from the first electronic device 100 at the time other than the notification limiting time.

According to an embodiment, the notification unit 230 may notify an event occurring from the first electronic device 100 on the basis of whether a user wears the second electronic device 200 and a notification limiting time. When notification criteria conflicts (for example, when a user wears the second electronic device 200 at a notification limiting time), the notification unit 230 may determine whether to transmit a notification message according to a priority. According to an embodiment, priorities for a plurality of criteria may be set by a user.

According to an embodiment, when an unworn state changes into a worn state, the notification unit 230 may notify that an event corresponding to a notification message received in an unworn state occurs. When a notification message received in an unworn state is in plurality, a plurality of events may be notified.

According to an embodiment, the notification unit 230 may notify an event corresponding to a notification message received at a notification limiting time when being out of the notification limiting time. When a notification message received in an unworn state is in plurality, a plurality of events may be notified.

The input unit 240 may receive a user command. According to an embodiment, the input unit 240 may receive a notification limiting time from a user. According to an embodiment, the input unit 240 may receive a power saving mode enter command from a user. According to an embodiment, the input unit 240 may receive a voice or video call acceptance command from a user.

According to an embodiment, the input unit 240 may be implemented using a touch screen or a touch pad, each operating by a user's touch input.

The control unit 250 may control overall operations of the second electronic device 200. According to an embodiment, the control unit 250 may perform a control to notify an event corresponding to a notification message on the basis of whether a user wears the second electronic device 200. According to an embodiment, the control unit 250 may perform a control to notify an event corresponding to a notification message on the basis of a notification limiting time.

According to various embodiments of the present disclosure, a second electronic device includes a communication unit receiving from a first electronic device a notification message for an event occurring from the first electronic device, a sensing unit determining whether a user wears the second electronic device by using a state of the second electronic device, and a notification unit notifying an event occurring from the first electronic device while the second electronic device is in a worn state and not notifying an event occurring from the first electronic device if the second electronic device is not in a worn state.

Figure 8:
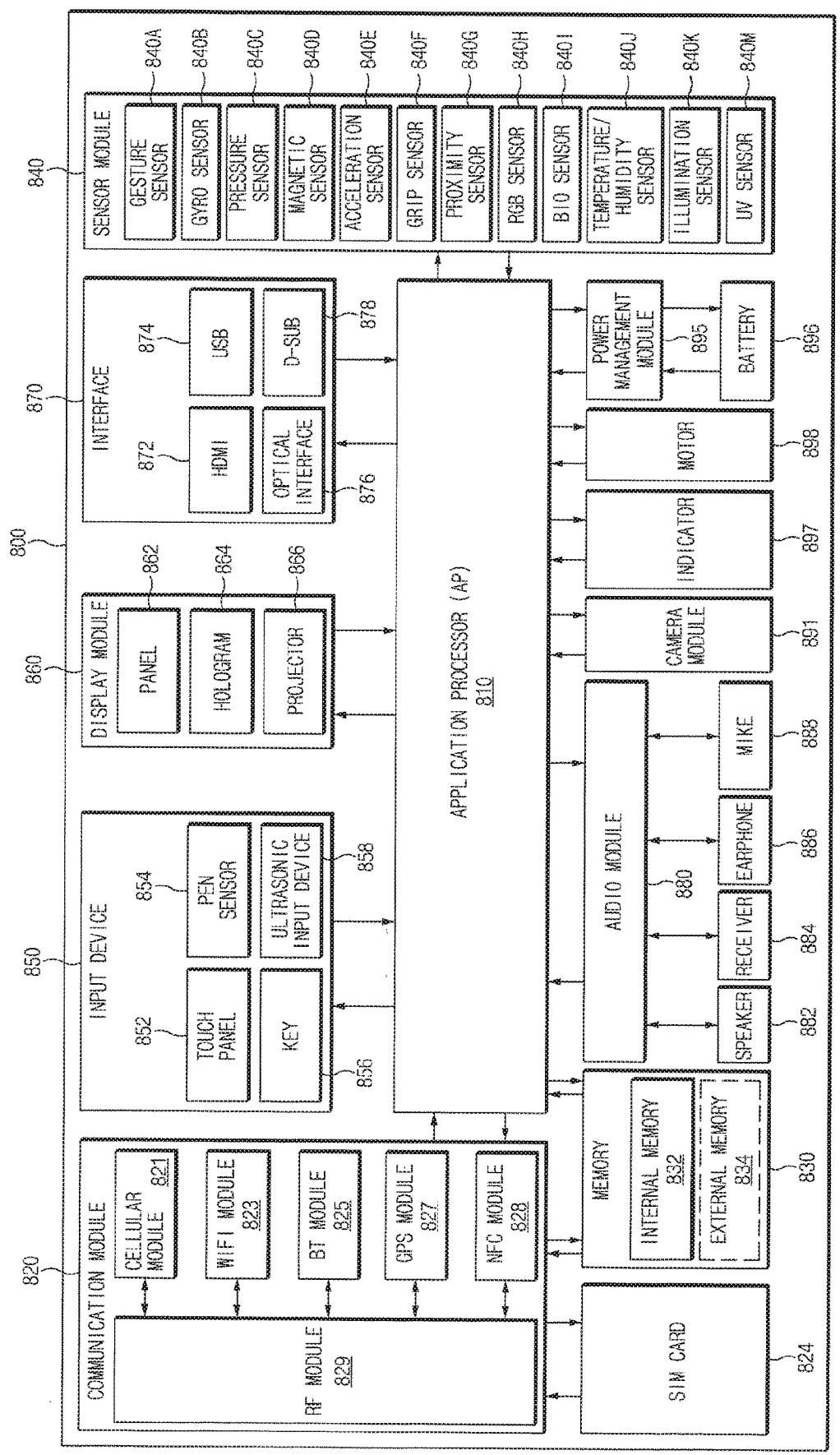
FIG. 8 illustrates a block diagram showing a first electronic device according to an embodiment of the present disclosure.

FIG. 8 is a block diagram illustrating a first electronic device according to various embodiments of the present disclosure. A first electronic device, for example, may configure all or part of the above-mentioned first electronic device 100 shown in FIG. 6. Referring to FIG. 8, the first electronic device includes at least one application processor (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may control a plurality of hardware or software components connected to the AP 810 and also may perform various data processing and operations with multimedia data by executing an operating system or an application program. The AP 810 may be implemented with a system on chip (SoC), for example. According to an embodiment of the present disclosure, the processor 810 may further include a graphic processing unit (GPU) (not shown).

The communication module 820 (for example, the communication unit 110) may perform data transmission through a communication between other electronic devices connected to the first electronic device (for example, the first electronic device 100) via a network. According to an embodiment of the present disclosure, the communication module 820 may include a cellular module 821, a Wifi module 823, a BT module 825, a GPS module 827, an NFC module 828, and a radio frequency (RF) module 829.

The cellular module 821 may provide voice calls, video calls, text services, or internet services through a communication network (for example, LTE, LTE-A, CDMA, WCDMA, UMTS, WiBro, or GSM). The cellular module 821 may perform a distinction and authentication operation on an electronic device in a communication network by using a subscriber identification module (for example, the SIM card 824), for example. According to an embodiment of the present disclosure, the cellular module 821 may perform at least part of a function that the AP 810 provides. For example, the cellular module 821 may perform at least part of a multimedia control function.

According to an embodiment of the present disclosure, the cellular module 821 may further include a communication processor (CP). Additionally, the cellular module 821 may be implemented with SoC, for example. As shown in FIG. 8, components such as the cellular module 821 (for example, a CP), the memory 830, or the power management module 895 are separated from the AP 810, but according to an embodiment of the present disclosure, the AP 810 may be implemented including some of the above-mentioned components (for example, the cellular module 821).

According to an embodiment of the present disclosure, the AP 810 or the cellular module 821 (for example, a CP) may load instructions or data, which are received from a nonvolatile memory or at least one of other components connected thereto, into a volatile memory and then may process them. Furthermore, the AP 810 or the cellular module 821 may store data received from or generated by at least one of other components in a nonvolatile memory.

Each of the Wifi module 823, the BT module 825, the GPS module 827, and the NFC module 828 may include a processor for processing data transmitted/received through a corresponding module. Although the cellular module 821, the Wifi module 823, the BT module 825, the GPS module 827, and the NFC module 828 are shown as separate blocks in FIG. 8, according to an embodiment of the present disclosure, some (for example, at least two) of the cellular module 821, the Wifi module 823, the BT module 825, the GPS module 827, and the NFC module 828 may be included in one integrated chip (IC) or an IC package. For example, at least some (for example, a CP corresponding to the cellular module 821 and a Wifi processor corresponding to the Wifi module 823) of the cellular module 825, the Wifi module 827, the BT module 828, the GPS module 821, and the NFC module 823 may be implemented with one SoC.

The RF module 829 may be responsible for data transmission, for example, the transmission of an RF signal. Although not shown in the drawings, the RF module 829 may include a transceiver, a power amp module (PAM), a frequency filter, or a low noise amplifier (LNA). Additionally, the RF module 829 may further include components for transmitting/receiving electromagnetic waves on a free space in a wireless communication, for example, conductors or conducting wires. Although the cellular module 821, the Wifi module 823, the BT module 825, the GPS module 827, and the NFC module 828 share one RF module 829 shown in FIG. 8, according to an embodiment of the present disclosure, at least one of the cellular module 821, the Wifi module 823, the BT module 825, the GPS module 827, and the NFC module 828 may perform the transmission of an RF signal through an additional RF module.

The SIM card 824 may be a card including a subscriber identification module and may be inserted into a slot formed at a specific position of a first electronic device. The SIM card 824 may include unique identification information (for example, an integrated circuit card identifier (ICCID)) or subscriber information (for example, an international mobile subscriber identity (IMSI)).

The memory 830 may include an internal memory 832 or an external memory 834. The internal memory 832 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 832 may be a Solid State Drive (SSD). The external memory 834 may further include flash drive, for example, compact flash (CF), secure digital (SD), micro secure digital (Micro-SD), mini secure digital (Mini-SD), extreme digital (xD), or memorystick. The external memory 834 may be functionally connected to the first electronic device through various interfaces. According to an embodiment of the present disclosure, the first electronic device may further include a storage device (or a storage medium) such as a hard drive.

The sensor module 840 measures physical quantities or detects an operating state of the first electronic device, thereby converting the measured or detected information into electrical signals. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (for example, a red, green, blue (RGB) sensor), a bio sensor 840I, a temperature/humidity sensor 840J, an illumination sensor 840K, and an ultra violet (UV) sensor 840M. Additionally/alternately, the sensor module 840 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 840 may further include a control circuit for controlling at least one sensor therein.

The input module 850 may include a touch panel 852, a (digital) pen sensor 854, a key 856, or an ultrasonic input device 858. The touch panel 852 may recognize a touch input through at least one of capacitive, resistive, infrared, or ultrasonic methods, for example. Additionally, the touch panel 852 may further include a control circuit. In the example of the capacitive method, both direct touch and proximity recognition are possible. The touch panel 852 may further include a tactile layer. In this example, the touch panel 852 may provide a tactile response to a user.

The (digital) pen sensor 854 may be implemented through a method similar or identical to that of receiving a user's touch input or an additional sheet for recognition. The key 856 may include a physical button, a touch key, an optical key, or a keypad, for example. The ultrasonic input device 858, as a device checking data by detecting sound waves through a mike (for example, the mike 888) in the first electronic device, may provide wireless recognition through an input tool generating ultrasonic signals. According to an embodiment of the present disclosure, the first electronic device may receive a user input from an external device (for example, a computer or a server) connected to the electronic device 901 through the communication module 820.

The display 860 may include a panel 862, a hologram device 864, or a projector 866. The panel 862, for example, may include a liquid-crystal display (LCD) or an active-matrix organic light-emitting diode (AM-OLED). The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen, for example, may be placed inside or outside the first electronic device. According to an embodiment of the present disclosure, the display 860 may further include a control circuit for controlling the panel 862, the hologram device 864, or the projector 866.

The interface 870 may include a high-definition multimedia interface (HDMI) 872, a universal serial bus (USB) 874, an optical interface 876, or a D-subminiature (sub) 878, for example. Additionally/alternately, the interface 870 may include a mobile high-definition link (MHL) interface, a secure Digital (SD) card/multi-media card (MMC) interface, or an infrared data association (IrDA) standard interface.

The audio module 880 may convert sound and electrical signals in both directions. The audio module 880 may process sound information inputted/outputted through a speaker 882, a receiver 884, an earphone 886, or a mike 888.

The camera module 891, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 895 may manage the power of the first electronic device. Although not shown in the drawings, the power management module 895 may include a power management integrated circuit (PMIC), a charger integrated circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 896, or a voltage, current, or temperature of the battery 396 during charging. The battery 896 may store or generate electricity and may supply power to the first electronic device by using the stored or generated electricity. The battery 896, for example, may include a rechargeable battery or a solar battery.

The indicator 897 may display a specific state of the first electronic device or part thereof (for example, the AP 810), for example, a booting state, a message state, or a charging state. The motor 898 may convert electrical signals into mechanical vibration. Although not shown in the drawings, the first electronic device may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the first electronic device according to various embodiments of the present disclosure may be configured with at least one component and the name of a corresponding component may vary according to the kind of an electronic device. A first electronic device according to an embodiment of the present disclosure may be configured including at least one of the above-mentioned components or additional other components. Additionally, some of components in a first electronic device according to an embodiment of the present disclosure are configured as one entity, so that functions of previous corresponding components are performed identically.

Figure 9:
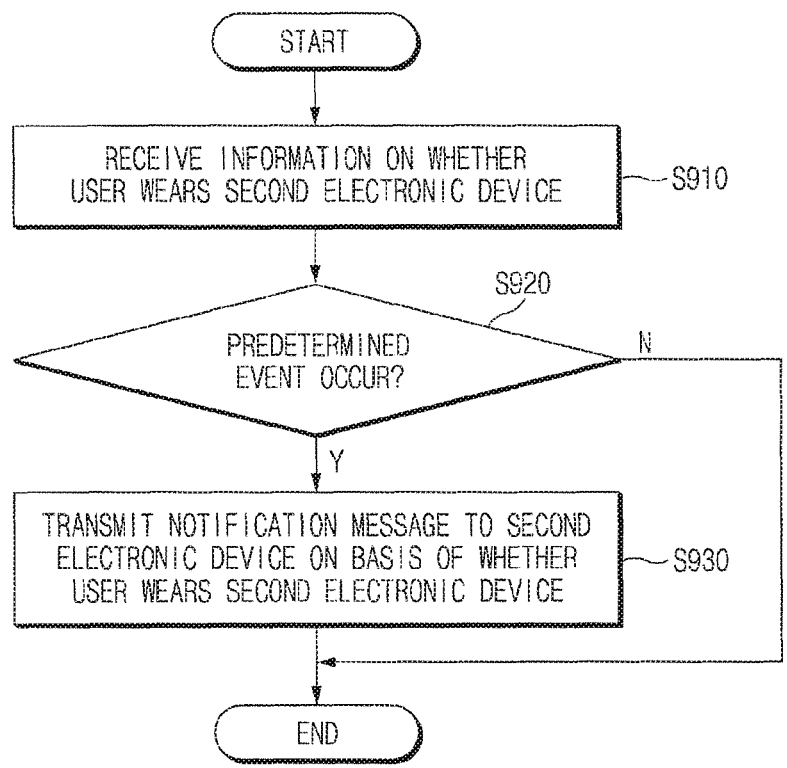
FIG. 9 illustrates a process of a power saving method of a first electronic device according to an embodiment of the present disclosure.

FIG. 9 is a flowchart illustrating a power saving method of a first electronic device according to an embodiment of the present disclosure.

The flowchart shown in FIG. 9 may be configured with time-series processes in the first electronic device shown in FIG. 6. Accordingly, even contents omitted below, which are described above for the first electronic device shown in FIG. 9, may be applied to the flowchart of FIG. 9.

Referring to FIG. 9, the first electronic device 100 may receive information on whether a user wears the second electronic device 200 in operation S910. Once a predetermined event occurs in the first electronic device 100 in operation S920, the first electronic device 100 may transmit a notification message to the second electronic device 200 on the basis of whether a user wears the second electronic device 200 in operation S930. According to an embodiment, when the second electronic device 200 is in a worn state, the first electronic device 100 may transmit a notification message and if not, may not transmit a notification.

According to an embodiment, the first electronic device 100 may receive a notification limiting time from the second electronic device 200. According to an embodiment, the first electronic device 100 may receive a setting for notification limiting time from a user. On the basis of the notification limiting time, the first electronic device 100 may transmit a notification message. For example, the communication unit 110 may not transmit a notification message to the second electronic device 200 at the notification limiting time and the communication unit 110 may transmit a notification message to the second electronic device 200 at the time other than the notification limiting time.

According to an embodiment, when receiving information representing a user's wearing state from the second electronic device 200, the first electronic device 100 may transmit a notification message on an event occurring when the second electronic device 200 is not worn. When there are a plurality of events occurring while the second electronic device 200 is not worn by a user, a notification message for them may be transmitted.

According to an embodiment, the first electronic device 100 may transmit a notification message for an event occurring at the notification limiting time when being out of the notification limiting time. When there are a plurality of events occurring at the notification limiting time, a notification message for them may be transmitted.

According to an embodiment, the first electronic device 100 may receive a notification message representing a battery state (for example, the battery remaining capacity is 10% or 100%) from the second electronic device 200. When receiving the notification message representing the battery state from the second electronic device 200, the first electronic device 100 may notify the battery state to a user.

According to an embodiment, upon the receipt of a voice or video call, the first electronic device 100 may transmit a notification message to the second electronic device 200 through a first communication method (for example, Bluetooth low energy (BLE)). Once the voice or video call acceptance signal is received from the second electronic device 200, the first electronic device 100 may connect to the second electronic device 200 through a second communication method (for example, Bluetooth classic). The first electronic device 100 may transmit/receive voice data to/from the second electronic device 200 through the second communication method.

According to various embodiments of the present disclosure, a power waving method of a first electronic device includes receiving information on whether a user wears a second electronic device from the second electronic device and transmitting a notification message for an event to the second electronic device on the basis of whether the user wears the second electronic device once a predetermined event occurs. The transmitting of the notification message includes transmitting a notification message to the second electronic device when the user wears the second electronic device and not transmitting a notification message to the second electronic device when the user does not wear the second electronic device.

Figure 10:
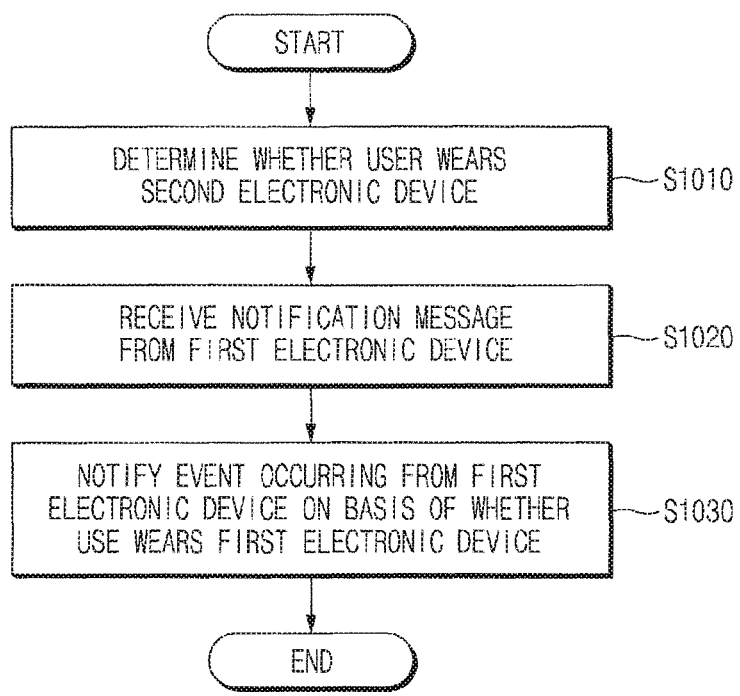
FIG. 10 illustrates a process of a power saving method of a second electronic device according to an embodiment of the present disclosure.

FIG. 10 is a flowchart illustrating a power saving method of a second electronic device according to an embodiment of the present disclosure.

The flowchart shown in FIG. 10 may be configured with time-series processes in the second electronic device shown in FIG. 7. Accordingly, even contents omitted below, which are described above for the second electronic device shown in FIG. 7, may be applied to the flowchart of FIG. 10.

Referring to FIG. 10, the second electronic device 200 determines whether a user wears it by sensing its state in operation S1010. According to an embodiment, the second electronic device 200 may determine whether a user wears it by using a gyro sensor, an acceleration sensor, a heart rate (HR) sensor, or a touch sensor.

The second electronic device 200 may receive a notification message for an event occurring from the first electronic device 100 from the first electronic device 100 in operation S1020.

The second electronic device 200 may notify an event occurring from the first electronic device 100 on the basis of whether a user wears the second electronic device 200 in operation S1030. For example, when worn by a user, the second electronic device 200 may notify an event occurring from the first electronic device 100 and when not worn by a user, may not notify an event occurring from the first electronic device 100.

According to an embodiment, when an unworn state changes into a worn state, the second electronic device 200 may notify that an event corresponding to a received notification message in an unworn state occurs.

According to an embodiment, the second electronic device 200 may receive a notification limiting time from a user. According to an embodiment, the second electronic device 200 may receive a notification limiting time from the first electronic device 100. When receiving the notification message from the first electronic device 100 at the notification limiting time, the second electronic device 200 may not notify an event occurring from the first electronic device 100.

According to an embodiment, when the battery remaining capacity becomes a predetermined state in a user's unwearing state, the second electronic device 200 may transmit a notification message representing a battery state to the first electronic device 100.

According to an embodiment, upon the receipt of a notification message notifying that a battery capacity is less than a predetermined capacity in a user's wearing state, the second electronic device 200 may notify a battery state of the first electronic device to a user. Once the power saving mode enter command is inputted from a user, the second electronic device 200 may transmit a power saving mode enter signal to the first electronic device 100.

According to various embodiments of the present disclosure, a power saving method of a second electronic device includes determining whether a user wears the second electronic device by sensing a state of the second electronic device, receiving from a first electronic device a notification message for an event occurring from the first electronic device, and notifying an event occurring from the first electronic device on the basis of whether the user wears the second electronic device. The notifying of the event occurring from the first electronic device includes notifying an event occurring from the first electronic device when the user wears the second electronic device or not notifying an event occurring from the first electronic device when the user does not wear the second electronic device.

According to various embodiments of the present disclosure, when not worn by a user, the second electronic device may not notify an event occurring from the first electronic device. Accordingly, the second electronic device may reduce battery consumption due to an unnecessary notification operation.

Additionally, while not wearing the second electronic device, a user may check a battery state of the second electronic device through the first electronic device and may check a battery state of the first electronic device through the second electronic device. Additionally, the first electronic device may enter a power saving mode conveniently by using the second electronic device.

The first electronic device and the second electronic device may reduce battery consumption by communicating with each other through BLE, except for voice data transmission.

According to various embodiments of the present disclosure, a power saving method of a first electronic device or a second electronic device may be implemented using a program executable by an electronic device. Then, such a program may be stored in various types of recording media and used.

In more detail, program code for executing the above method may be stored in various types of non-volatile recording media, for example, Flash memory, Read Only Memory (ROM), Erasable Programmable ROM (EPROM), Electronically Erasable and Programmable ROM (EEPROM), hard disk, removable disk, memory card, USB memory, and CD-ROM.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a communication unit configured to communicate with an external electronic device;
an input unit configured to receive a setting for limiting notification; and
a processor configured to:
connect to the external electronic device,
when a first predetermined event occurs before receiving the setting for limiting notification and while connected to the external electronic device, transmit a first notification message to the external electronic device,
when the first predetermined event occurs after receiving the setting for limiting notification and while connected to the external electronic device, withhold transmitting the first notification message to the external electronic device,
receive, from the external electronic device, a first information indicating that the external electronic device is in an unworn state, and
when a second predetermined event occurs after receiving the first information indicating that the external electronic device is in the unworn state, prevent a second notification message from being transmitted to the external electronic device.

2. The electronic device according to claim 1, wherein the processor is further configured to:
receive, from the external electronic device, a control signal indicating the setting for limiting notification; and
withhold transmitting the first notification message to the external electronic device when the first predetermined event occurs after receiving the setting for limiting notification.

3. The electronic device according to claim 1, wherein the processor is further configured to:
receive, from the external electronic device, second information indicating that the external electronic device is in a worn state,
after receiving the second notification message indicating that the external electronic device is in the worn state, transmit, to the external electronic device, the second notification message.

4. The electronic device according to claim 1, wherein the processor is further configured to:
in response to receiving, from the external electronic device, a third notification message representing a battery state of the external electronic device, notify the battery state of the external electronic device to a user; and
transmit a power saving mode enter signal to the external electronic device.

5. The electronic device according to claim 1, wherein the processor is further configured to:
transmit the first notification message to the external electronic device through a first communication method when receiving a voice call or a video call, and
communicate voice data with the external electronic device through a second communication method when receiving an acceptance signal associated with the voice or video call from the external electronic device.

6. The electronic device according to claim 5, wherein the first communication method is Bluetooth low energy (BLE) and the second communication method is Bluetooth Classic.

* * * * *